(12) United States Patent
Giannini

(10) Patent No.: US 11,634,212 B1
(45) Date of Patent: Apr. 25, 2023

(54) CONTROL SYSTEM FOR AN AIRCRAFT AND A METHOD OF OPERATING THE CONTROL SYSTEM

(71) Applicant: Aurora Flight Sciences Corporation, a subsidiary of The Boeing Company, Manassas, VA (US)

(72) Inventor: Francesco Giannini, Falls Church, VA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 36 days.

(21) Appl. No.: 17/492,011

(22) Filed: Oct. 1, 2021

(51) Int. Cl.
| | | |
|---|---|---|
| *B64C 21/08* | (2006.01) | |
| *B64C 29/00* | (2006.01) | |
| *B64C 21/02* | (2006.01) | |
| *B64C 9/00* | (2006.01) | |
| *B64D 35/04* | (2006.01) | |
| *B64D 29/02* | (2006.01) | |

(52) U.S. Cl.
CPC .............. *B64C 21/08* (2013.01); *B64C 9/00* (2013.01); *B64C 21/025* (2013.01); *B64C 29/0033* (2013.01); *B64D 29/02* (2013.01); *B64D 35/04* (2013.01)

(58) Field of Classification Search
CPC ......... B64C 21/08; B64C 9/00; B64C 21/025; B64C 29/0033; B64D 29/02; B64D 35/04
See application file for complete search history.

(56) References Cited

U.S. PATENT DOCUMENTS

| | | | |
|---|---|---|---|
| 2,936,967 A | | 5/1960 | Dancik |
| 3,666,209 A | * | 5/1972 | Taylor ................. B64C 29/0033 244/12.4 |
| 3,917,193 A | | 11/1975 | Runnels, Jr. |
| 4,392,621 A | * | 7/1983 | Viets ..................... B64C 21/025 137/829 |
| 4,482,108 A | * | 11/1984 | Sutton ................. B64C 29/0083 244/23 B |
| 4,709,880 A | * | 12/1987 | Bradfield ............ B64C 29/0066 244/12.5 |
| 5,348,256 A | | 9/1994 | Parikh |
| 9,108,725 B1 | * | 8/2015 | Shmilovich ............. B64C 21/04 |
| 10,926,874 B2 | * | 2/2021 | Giannini ............. B64C 29/0033 |
| 10,967,957 B2 | * | 4/2021 | Harrison ................... B64C 9/28 |
| 2006/0102801 A1 | | 5/2006 | Manley |
| 2011/0030336 A1 | | 2/2011 | Kuehn et al. |

* cited by examiner

*Primary Examiner* — Brian M O'Hara
(74) *Attorney, Agent, or Firm* — Quinn IP Law

(57) ABSTRACT

An aircraft and a control system for the aircraft includes a tilt-wing defining an inlet configured to receive air and an outlet in fluid communication with the inlet such that the outlet is configured to expel the air. The control system includes a high-lift device coupled to at least one of a leading edge, and a trailing edge of the tilt-wing. The high-lift device is movable relative to the tilt-wing. The control system includes a compressor in fluid communication with the inlet and the outlet. The compressor is configured to increase pressure of the air that is expelled out of the outlet. The outlet directs the pressurized air toward at least one of the high-lift device and a center section of the tilt-wing to maintain attachment of airflow across the tilt-wing. A method of operating the control system of the aircraft occurs to maintain attachment of airflow across the tilt-wing.

20 Claims, 6 Drawing Sheets

CONTROL SYSTEM FOR AN AIRCRAFT AND A METHOD OF OPERATING THE CONTROL SYSTEM

BACKGROUND

The present disclosure generally relates to utilizing a control system to maintain attachment of airflow across a tilt-wing, as well as associated methods for operating the control system to maintain attachment of airflow across the tilt-wing.

It has been desirable to produce an aircraft which is capable of taking-off and landing despite relatively short runway distances. This may be accomplished through increasing thrust of the aircraft and through improving lift of the aircraft. If increasing the thrust of the aircraft, larger, more-powerful engines are used which add weight to the aircraft and consume greater quantities of fuel. Instead of increasing the size of the engine, several other lift-enhancing techniques have been developed, such as using a larger wing to improve lift, or lift-enhancement systems that involves increasing the velocity of air directed over the wing to improve lift. As lift is generally a function of the velocity of the air, the greater the velocity of the air over the wing of the aircraft, generally the greater the lift that is produced. One example of a lift-enhancement system utilizes bleed air from the engine of the aircraft, in which the bleed air is blown across flaps of the wing to improve lift characteristics of the wing, and ultimately improve lift characteristics of the aircraft. Another example of a lift-enhancement system is a boundary layer control system that re-energizes airflow at a knee of a flap such that the airflow remains attached to the flap to improve lift characteristics of the wing.

However, taking the bleed air from the engine decreases the amount of thrust that is available. Furthermore, the bleed air is hot, and thus require internal ducting of the hot bleed air, and/or deflecting of the hot bleed air across the wing. Also, the ducting for the hot bleed air tends to be heavy. In addition, directing the bleed air from the engine to the wings may require long ducting which contributes to additional cost, weight, and maintenance to the aircraft.

SUMMARY

Therefore, it is desirable to develop a control system that guides air through a tilt-wing, pressurizes the air, and directs the pressurized air toward at least one of a high-lift device and a center section of the tilt-wing to maintain attachment of airflow across the tilt-wing, and ultimately improve overall lift characteristics of an aircraft.

The present disclosure pertains to a control system for an aircraft. The control system includes a tilt-wing that defines an inlet configured to receive air and an outlet in fluid communication with the inlet such that the outlet is configured to expel the air. The tilt-wing includes a leading edge, a trailing edge, and a center section disposed adjacent to the leading edge. The tilt-wing is pivotable between a cruise position and a hover position. The control system also includes a high-lift device coupled to at least one of the leading edge and the trailing edge of the tilt-wing. The high-lift device is movable relative to the tilt-wing, when deployed, as the tilt-wing transitions between the cruise position and the hover position. The control system further includes a compressor in fluid communication with the inlet and the outlet. The compressor is configured to increase pressure of the air that is expelled out of the outlet. The outlet directs the pressurized air toward at least one of the high-lift device and the center section of the tilt-wing to maintain attachment of airflow across the tilt-wing.

The present disclosure also pertains to an aircraft that includes a fuselage and a control system. The control system includes a tilt-wing coupled to the fuselage. The tilt-wing includes a leading edge, a trailing edge, and a center section disposed adjacent to the leading edge. The tilt-wing is pivotable relative to the fuselage between a cruise position and a hover position. The tilt-wing defines an inlet configured to receive air and an outlet in fluid communication with the inlet such that the outlet is configured to expel the air. The control system also includes a high-lift device coupled to at least one of the leading edge and the trailing edge of the tilt-wing. The high-lift device is movable relative to the tilt-wing, when deployed, as the tilt-wing transitions between the cruise position and the hover position. The control system further includes a compressor in fluid communication with the inlet and the outlet. The compressor is configured to increase pressure of the air that is expelled out of the outlet. The outlet directs the pressurized air toward at least one of the high-lift device and the center section of the tilt-wing to maintain attachment of airflow across the tilt-wing.

The present disclosure further pertains to a method of operating a control system of an aircraft. A tilt-wing of the aircraft transitions between a cruise position and a hover position. The tilt-wing defines an inlet configured to receive air and an outlet in fluid communication with the inlet such that the outlet is configured to expel the air. A high-lift device is actuated along at least one of a leading edge of the tilt-wing and a trailing edge of the tilt-wing when the tilt-wing transitions between the cruise position and the hover position. Determining whether a boundary layer separation condition is met. The boundary layer separation condition occurs as a boundary of airflow begins to separate from the tilt-wing. A compressor is activated in response to meeting the boundary layer separation condition, in which the compressor operates to increase pressure of the air that is expelled out of the outlet. The outlet directs the pressurized air toward at least one of the high-lift device and a center section of the tilt-wing to maintain attachment of airflow across the tilt-wing.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

Figure 1:
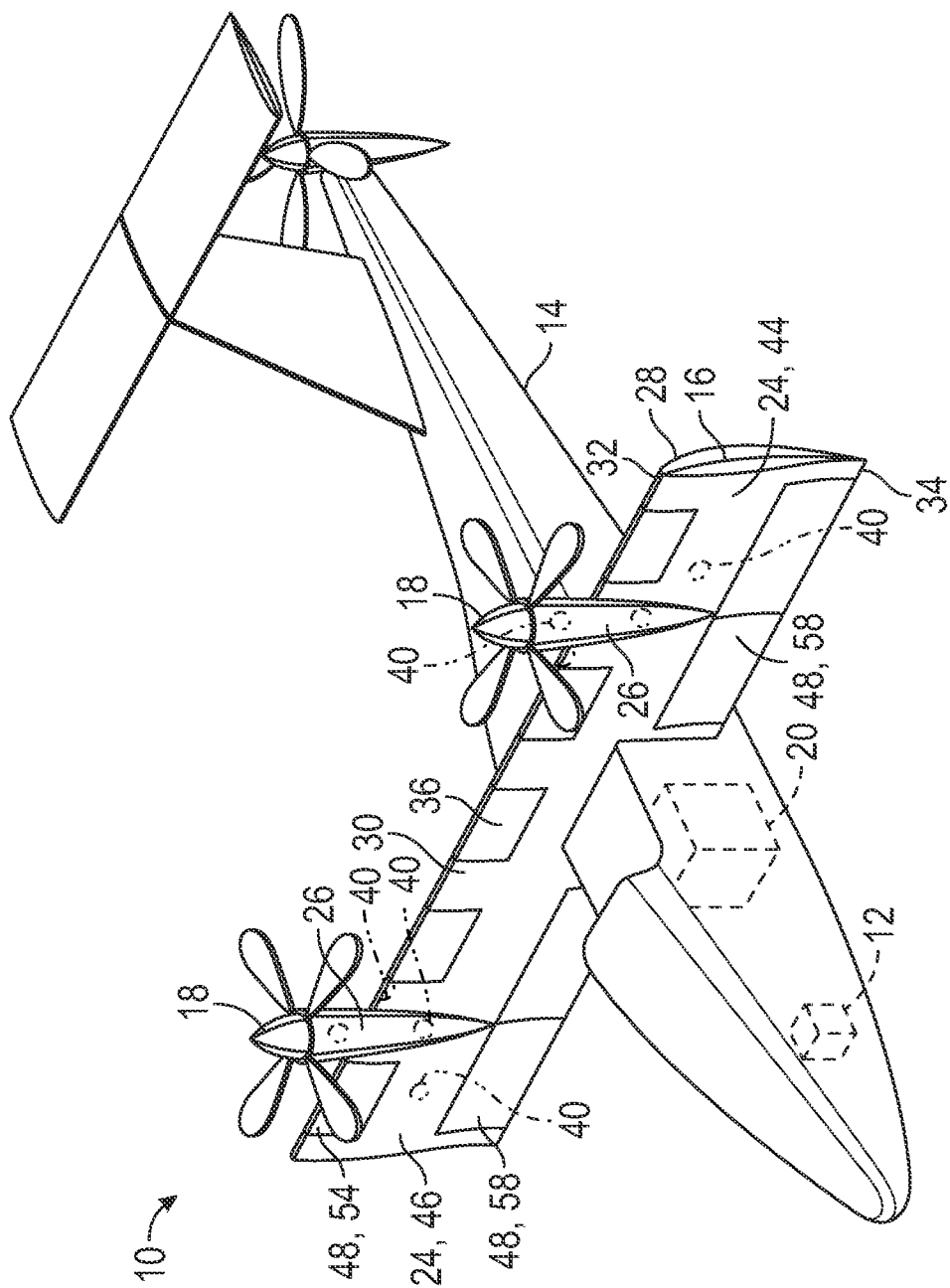
FIG. 1 is a schematic perspective view of an aircraft having a tilt-wing in a hover position.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

As used herein, an element or step recited in the singular and preceded by the word "a" or "an" should be understood as not necessarily excluding the plural of the elements or steps. Further, any reference to "one configuration" is not intended to be interpreted as excluding the existence of additional configurations that also incorporate the recited features. Moreover, unless explicitly stated to the contrary, configurations "comprising" or "having" an element or a plurality of elements having a particular property may include additional elements not having that property. The phrase "at least one of" as used herein should be construed to include the non-exclusive logical "or", i.e., A and/or B and so on depending on the number of components.

Referring to the figures, wherein like numerals indicate like or corresponding parts throughout the several views, an aircraft 10 is generally shown in FIG. 1. As will be discussed in detail below, a control system 12 for the aircraft 10 may be used to improve overall lift characteristics of the aircraft 10.

Figure 2:
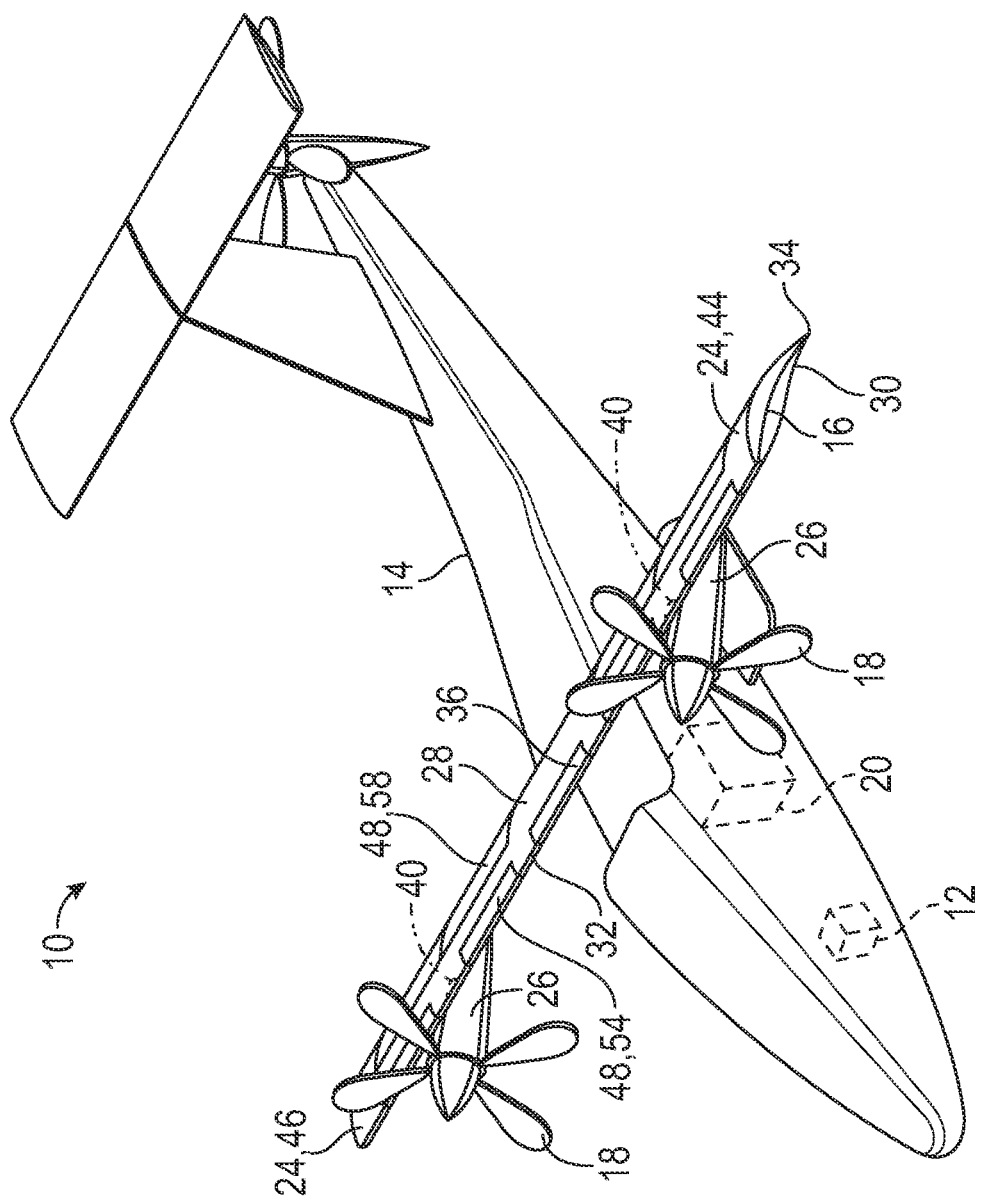
FIG. 2 is a schematic perspective view of the aircraft having the tilt-wing in a transition position.
Figure 3:
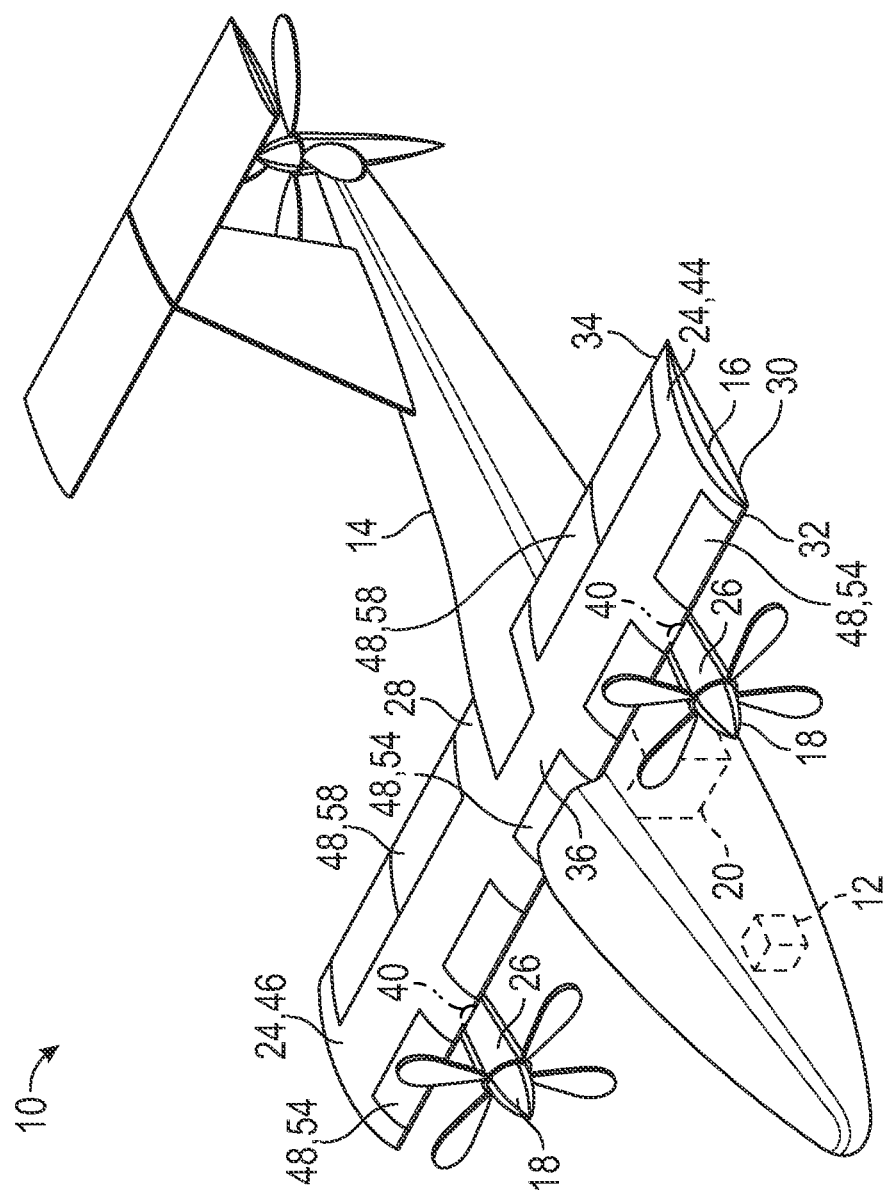
FIG. 3 is a schematic perspective view of the aircraft having the tilt-wing in a cruise position.

Referring to FIGS. 1-3, the aircraft 10 may include a fuselage 14 and a tilt-wing 16 coupled to the fuselage 14. Generally, the aircraft 10 may take-off from a location, cruise, and land at a desired location. The tilt-wing 16 is movable depending on the desired speed of the aircraft 10, which will be discussed further below.

The aircraft 10 may take-off and land on a runway, a landing pad, or any suitable ground. Therefore, the aircraft 10 may include a landing gear assembly indirectly or directly coupled to the fuselage 14. Optionally, the landing gear assembly may be movable relative to the fuselage 14 between a retracted position and an extended position. During landing and take-off, the landing gear assembly is in the extended position to facilitate movement of the aircraft 10 on the ground. When the aircraft 10 is in the air, if the landing gear is retractable, the landing gear assembly may move to the retracted position to minimize drag.

Continuing with FIGS. 1-3, the tilt-wing 16 is pivotable depending on the desired speed of the aircraft 10. Generally, the tilt-wing 16 is pivotable relative to the fuselage 14 (compare FIGS. 1-3). For example, the tilt-wing 16 may be pivotable between a hover position (see FIG. 1) and a cruise position (see FIG. 3), and may pivot to a transition position (see FIGS. 2 and 4). The transition position is between the hover position and the cruise position. More specifically, the transition position may occur during ascent of the aircraft 10 and during descent of the aircraft 10. The transition position of the tilt-wing 16 includes any pivotable movement or position of the tilt-wing 16 between the hover position and the cruise position, and may be referred to as the tilt-wing transitions between the hover position and cruise position or transitions between the cruise position and the hover position.

When the aircraft 10 is taking off and landing, the tilt-wing 16 may be in the hover position, in which the tilt-wing 16 is substantially vertical relative to the fuselage 14. When the aircraft 10 is ascending or climbing after take-off, the tilt-wing 16 may transition to the transition position, which in this case may be referred to as outbound transition. When the tilt-wing 16 is in the outbound transition, the tilt-wing 16 is transverse to the fuselage 14 such that the tilt-wing 16 is not substantially horizontal and not substantially vertical relative to the fuselage 14. When the aircraft 10 has reached the desired altitude or has leveled off after climbing, the tilt-wing 16 may be in the cruise position, in which the tilt-wing 16 is substantially horizontal relative to the fuselage 14. When the aircraft 10 is descending toward landing, the tilt-wing 16 may transition to the transition position, which in this case may be referred to as inbound transition. When the tilt-wing 16 is in the inbound transition, the tilt-wing 16 is transverse to the fuselage 14 such that the tilt-wing 16 is not substantially horizontal and not substantially vertical relative to the fuselage 14. It is to be appreciated that more than one tilt-wing 16 may be coupled to the fuselage 14 and may include the features described herein.

Referring to FIGS. 1-3, the aircraft 10 may include a propeller 18 supported by the tilt-wing 16 and a powerplant 20 coupled to the fuselage 14. The powerplant 20 is configured to produce torque, and the torque is ultimately transferred to the propeller 18 to rotate the propeller 18. That is, the propeller 18 is coupled to the powerplant 20 such that the powerplant 20 supplies the torque to rotate the propeller 18. In other words, the powerplant 20 supplies thrust to the propeller 18 to propel the aircraft 10 through the air. The powerplant 20 may be throttled-up to increase thrust to the propeller 18 and the powerplant 20 may be throttled-back to decrease thrust to the propeller 18. Depending on the amount of thrust delivered to the propeller 18, the aircraft 10 may ascend, descend, or remain at the same altitude. Generally, more thrust is needed for take-off than landing, and thus, there is excess power available from the powerplant 20 during descent of the aircraft 10, which will be discussed further below. It is to be appreciated that the powerplant 20 may include one or more engines, such as fuel powered engines, electric motors, or any other suitable type of powerplant 20 that produces torque to propel the aircraft 10. Optionally, more than one propeller 18 may be supported by the tilt-wing 16. For example, as shown in FIGS. 1-4, two propellers 18 are illustrated, but any suitable number of propellers 18 may be utilized. Therefore, the powerplant 20 is coupled to any number of the propellers 18.

Figure 5:
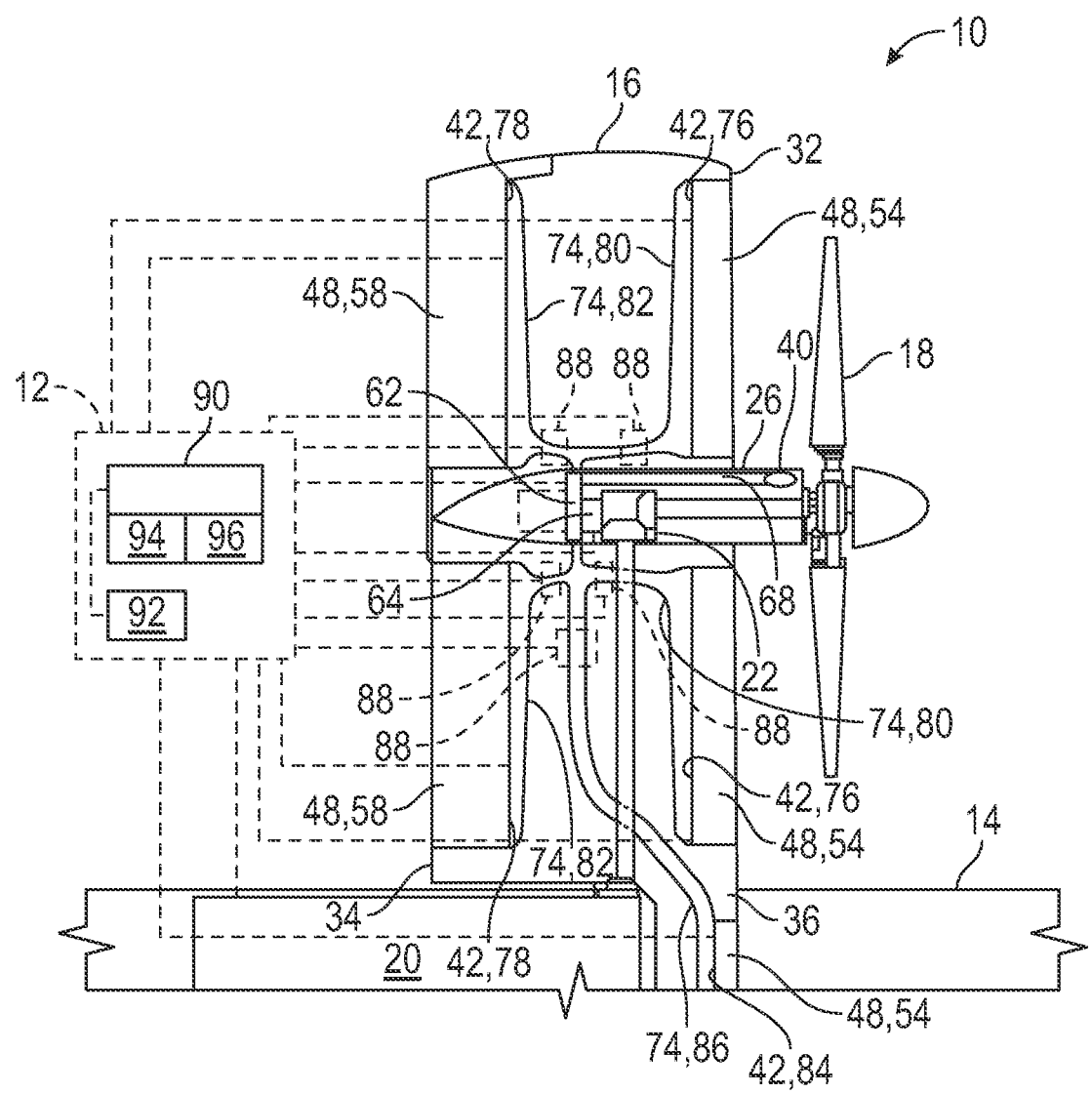
FIG. 5 is a schematic fragmented illustration of part of the features of the tilt-wing and part of the features inside of a fuselage of the aircraft.

Turning to FIG. 5, the aircraft 10 may include a transmission 22 coupled to the powerplant 20 and the propeller 18. The transmission 22 is configured to transfer the torque to the propeller 18 to rotate the propeller 18. More specifically, the transmission 22 is coupled to the powerplant 20 and the propeller 18 such that the transmission 22 transfers the torque from the powerplant 20 to the propeller 18. It is to be appreciated that the transmission 22 may include a gear-box, one or more gears, one or more gear sets, one or more clutches, one or more shafts, one or more cross-shafts, etc., to transfer the torque from the powerplant 20 and the propeller 18. In certain configurations, the transmission 22 may be referred to as a drivetrain.

The tilt-wing 16 may include a wing housing 24 and a nacelle 26 attached to the wing housing 24. The wing housing 24 and the nacelle 26 may cover or house various components of the aircraft 10. For example, at least one of the wing housing 24 and the nacelle 26 may house the transmission 22 or part of the transmission 22. As another example, the nacelle 26 may house one or more shafts and bearings, etc. Generally, the propeller 18 protrudes outside of the nacelle 26.

As the aircraft 10 moves through the air, airflow over the tilt-wing 16 generates lift, and the tilt-wing 16 utilizes lift and thrust to transition from the hover position to the cruise position and from the cruise position to the hover position. When the tilt-wing 16 is pivoted to the transition position, the transitions are done efficiently when the tilt-wing 16 is mostly unstalled, thus generating lift and moderate amounts of drag. Therefore, the transitions may be done efficiently when the angle of attack of the tilt-wing 16 is below a stall angle of the tilt-wing 16.

During descent of the aircraft 10, lift is partially generated via rotation of the propeller 18. Therefore, a propeller slipstream, generated via the propeller 18, prevents the tilt-wing 16 from stalling in most conditions. It is desirable to provide sufficient propeller slipstream to prevent the tilt-wing 16 from stalling. When the propeller 18 is throttled-back during descent of the aircraft 10, the torque from the powerplant 20 is decreased and the propeller slipstream decreases, so there is a balance between throttling-back and providing enough propeller slipstream to prevent the tilt-wing 16 from stalling. The propeller slipstream will be discussed further below.

Figure 4:
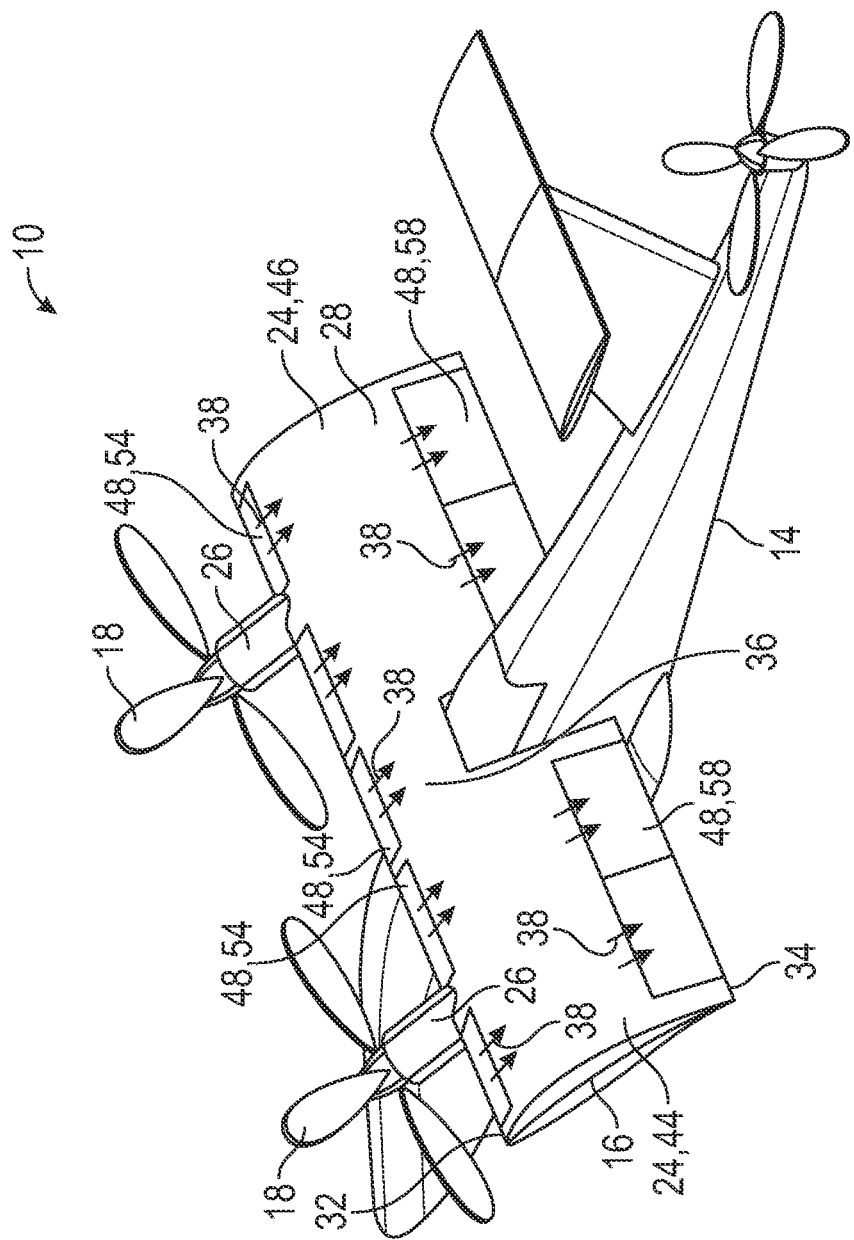
FIG. 4 is another schematic perspective view of the aircraft with the tilt-wing in the transition position.

Referring to FIG. 2, the tilt-wing 16 may include a top surface 28 and a bottom surface 30 in which the airflow is moving across the top surface 28 and the bottom surface 30 of the tilt-wing 16. As best shown in FIGS. 3 and 4, the tilt-wing 16 includes a leading edge 32, a trailing edge 34, and a center section 36 disposed adjacent to the leading edge 32. Generally, the leading edge 32 is a forward edge of the tilt-wing 16, the trailing edge 34 is a rear edge of the tilt-wing 16, and the center section 36 overlaps the fuselage 14, as best shown in FIG. 3. Continuing with FIG. 3, the tilt-wing 16 extends outward from opposing sides of the fuselage 14, and the center section 36 is disposed along the forward edge or the leading edge 32 of the tilt-wing 16 over the fuselage 14. That is, the center section 36 does not extend to the trailing edge 34. When the aircraft 10 is moving forward, the air splits at the leading edge 32, and some air flows across the top surface 28 and some air flows across the bottom surface 30 of the tilt-wing 16 to the trailing edge 34.

A layer of the air that is moving across the top surface 28 and the bottom surface 30 of the tilt-wing 16 may be referred to as a boundary layer 38 (see FIG. 4). The top surface 28 of the tilt-wing 16 works more to generate lift than the bottom surface 30 of the tilt-wing 16. As the boundary layer 38 slows down and loses energy, airflow separation may occur along the tilt-wing 16. For example, during descent when thrust is decreased, the propeller slipstream decreases, and thus, the boundary layer 38 slows down which may lead to airflow separation. The control system 12 provides additional energy to the boundary layer 38, which causes the boundary layer 38 to remain attached to the top surface 28 of the tilt-wing 16, and in certain configurations, remain attached to a rear flap 58 along the trailing edge 34, and thus continue to generate lift as the angle of attack increases. That is, the control system 12 prevents or limits airflow separation from the tilt-wing 16. Controlling the boundary layer 38 of airflow may be referred to as boundary layer control.

By utilizing the control system 12, lift characteristics of the aircraft 10 may be improved by using boundary layer control. Generally, the control system 12 pressurizes the air and directs the pressurized air to various location along the tilt-wing 16 to maintain attachment of the airflow across the tilt-wing 16, and thus controlling the boundary layer 38. The air being pressurized is ambient air. That is, the pressurized air is not inclusive of the bleed air that is being expelled from operating the powerplant 20.

Figure 6:
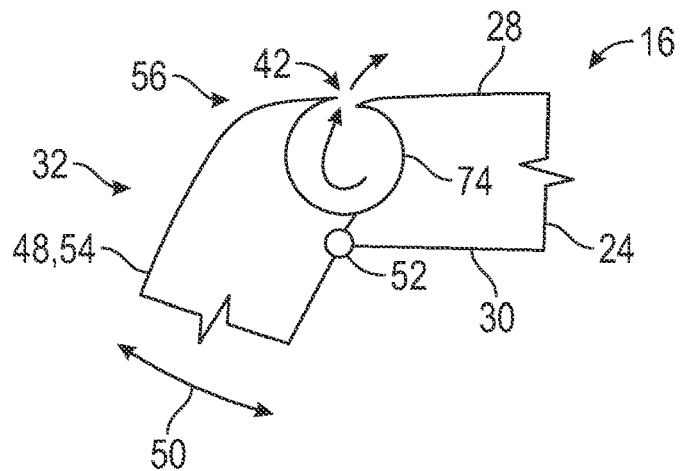
FIG. 6 is a schematic fragmented illustration of a high-lift device disposed along a leading edge of the tilt-wing.
Figure 7:
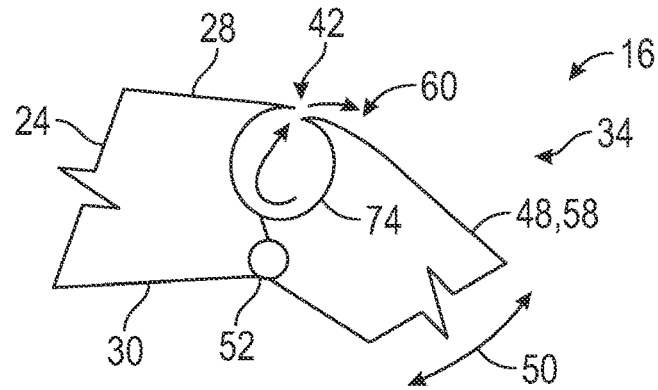
FIG. 7 is a schematic fragmented illustration of a high-lift device disposed along a trailing edge of the tilt-wing.

Referring to FIGS. 1-3 and 5, the tilt-wing 16 defines an inlet 40 configured to receive the air and an outlet 42 in fluid communication with the inlet 40 such that the outlet 42 is configured to expel the air. The inlet 40 and the outlet 42 may be along various locations of the tilt-wing 16, and the figures are for illustrative purposes only. For example, FIG. 1 illustrates many different possible locations of the inlet 40, and FIGS. 5-7 illustrates many different possible locations of the outlet 42. Therefore, referring to FIG. 1, the inlet 40 may be disposed along the leading edge 32 of the tilt-wing 16, the inlet 40 may be disposed in the bottom surface 30 of the tilt-wing 16, and the inlet 40 may be disposed in the nacelle 26 of the tilt-wing 16, and combinations thereof. The inlet 40 is shown in phantom lines (dash-dot-dot-dash lines) in the figures because any suitable number of inlets 40 may be used and any suitable shape or configuration of the inlets 40 may be used. The figures are illustrative of various examples of multiple possible locations of the inlet 40.

Optionally, a filter may be disposed within the inlet 40 to capture particles and/or guide particles out of the tilt-wing 16 and away from various internal components. Any suitable type of filter may be used, and non-limiting examples may include a barrier-type of filter or an inertial particle separator defining a pathway that has bends, turns, and/or corners which drives the particles outwardly to a particle exit that is along a different pathway from the outlet 42.

As discussed above, the tilt-wing 16 may extend outwardly from opposing sides of the fuselage 14, and therefore, the tilt-wing 16 may include a first wing section 44 and a second wing section 46 spaced from each other. The center section 36 is disposed between the first wing section 44 and the second wing section 46. The first wing section 44 and the second wing section 46 may each include the leading edge 32 and the trailing edge 34 as discussed above. One or more propellers 18 may be supported by each of the first wing section 44 and the second wing section 46. The inlet 40 and the outlet 42 may optionally be disposed along each of the first wing section 44 and the second wing section 46.

Turning to the outlet 42, generally, the location of the outlet 42 directs the pressurized air to the desired locations along the tilt-wing 16 to maintain attachment of the airflow across the tilt-wing 16. For example, the outlet 42 is disposed adjacent to at least one of the trailing edge 34 of the tilt-wing 16, the leading edge 32 of the tilt-wing 16, and the center section 36 of the tilt-wing 16. Therefore, for example, the outlet 42 may be disposed adjacent to one location (i.e., the leading edge 32 or the trailing edge 34 or the center section 36), two locations (any two combinations of the leading edge 32, the trailing edge 34, and the center section 36) or three locations (all three of the leading edge 32, the trailing edge 34, and the center section 36). Therefore, the outlet 42 may be disposed adjacent to one or more of the leading edge 32, the trailing edge 34 and the center section 36. FIG. 5 is illustrative of the possibility of the outlet 42 being along the leading edge 32 and the trailing edge 34.

FIG. 5 is also illustrative of the possibility of the outlet 42 being along the center section 36 at the leading edge 32 of the tilt-wing 16. FIG. 6 is illustrative of the outlet 42 being adjacent to either of the leading edge 32 of the first wing section 44, the leading edge 32 of the second wing section 46, or the center section 36, and FIG. 7 is illustrative of the outlet 42 being adjacent to the trailing edge 34. The figures are illustrative of various examples of multiple possible locations of the outlet 42. It is to be appreciated that any suitable number of the outlets 42 may be used and any suitable shape or configuration of the outlets 42 may be used.

Referring to FIGS. 1-4, the aircraft 10 may include a high-lift device 48 coupled to at least one of the leading edge 32 and the trailing edge 34 of the tilt-wing 16. Therefore, the high-lift device 48 may be coupled to the leading edge 32, or the high-lift device 48 may be coupled to the trailing edge 34, or the high-lift device 48 may be coupled to the leading edge 32 and the trailing edge 34. Generally, the high-lift device 48 is disposed along the tilt-wing 16 to provide a way to increase an amount of lift produced by the tilt-wing 16, and examples of the high-lift device 48 are discussed further below. One way to increase lift is by increasing the angle of attack of the tilt-wing 16, which may be accomplished by using the high-lift device 48. The angle of attack of the tilt-wing 16 may be increased up to the stall angle of the tilt-wing 16, and therefore, using the control system 12 disclosed herein provides a way of increasing the stall angle of the tilt-wing 16.

Generally, the tilt-wing 16 supports the high-lift device 48, and more specifically, the first wing section 44 and the second wing section 46 may support the high-lift device 48. The high-lift device 48 is movable relative to the tilt-wing 16 (see arrow 50 in FIGS. 6 and 7 to generally illustrate movement of the high-lift device 48). Therefore, the high-lift device 48 is also movable independently of the tilt-wing 16. For example, the high-lift device 48 may be movable relative to a pivot point 52 between an initial position in which the high-lift device 48 is not being operated and a deployed position in which the high-lift device 48 is being operated. In FIGS. 6 and 7, the high-lift device 48 is in the deployed position. Generally, the high-lift device 48 is movable relative to the tilt-wing 16, when deployed, as the tilt-wing 16 transitions between the cruise position and the hover position.

When the aircraft 10 is in a descent transitioning from the cruise position toward the hover position, the tilt-wing 16 may pivot to the transition position, and the high-lift device 48 may move to the deployed position to assist with lift characteristics of the tilt-wing 16. Generally, the high-lift device 48 may move with the tilt-wing 16 between the hover position, the transition position, and the cruise position, and additionally, the high-lift device 48 may move between the initial position and the deployed position independently of the tilt-wing 16 when in the hover position, the transition position, and the cruise position. When the high-lift device 48 is in the deployed position, a deflection angle of the high-lift device 48 relative to the tilt-wing 16 may cause the boundary layer 38 to detach from the tilt-wing 16, and therefore, it is desirable to use the control system 12 to prevent or limit airflow separation from the tilt-wing 16 by directing the pressurized air at certain locations along the tilt-wing 16.

In certain configurations, the high-lift device 48 is disposed along the leading edge 32 of the tilt-wing 16 (see FIGS. 1-4 and 6). In this configuration, the high-lift device 48 may optionally include a front flap 54 coupled to the leading edge 32 of the tilt-wing 16, and the front flap 54 is pivotable relative to the tilt-wing 16. Therefore, the front flap 54 may be movable about the pivot point 52 between the initial position and the deployed position relative to the tilt-wing 16. For example, the front flap 54 may be disposed along the first wing section 44 and the second wing section 46. Furthermore, optionally, another front flap 54 may be disposed along the center section 36. Therefore, optionally, the high-lift device 48 may be disposed along the center section 36.

The outlet 42 may be disposed adjacent to the leading edge 32 to direct the pressurized air along a knee 56 of the front flap 54 (see FIG. 6). Generally, the knee 56 of the front flap 54 is located where the airflow separation may occur, and thus, blowing the knee 56 of the front flap 54 may prevent or delay the airflow separation from the tilt-wing 16. For illustrative purposes, the knee 56 of the front flap 54 may be along the greatest curvature of the front flap 54 when the front flap 54 is at a high deflection angle. By directing the pressurized air toward the knee 56 of the front flap 54, the airflow separation may be delayed. Therefore, when the airflow separation is delayed, higher flap deflections and higher lift coefficients of the front flap 54 may be permitted. As one non-limiting example, the front flap 54 may be a slat. Deploying the front flap 54 or slat allows the tilt-wing 16 to operate at a higher angle of attack as compared to the front flap 54 or slat not being deployed or using the tilt-wing 16 without having the front flap 54. It is to be appreciated that optionally more than one front flap 54 may be disposed along the leading edge 32 (which for illustrative purposes is shown in FIGS. 1-4).

In other configurations, the high-lift device 48 is disposed along the trailing edge 34 of the tilt-wing 16 (see FIGS. 1-4 and 7). In this configuration, the high-lift device 48 may optionally include a rear flap 58 coupled to the trailing edge 34 of the tilt-wing 16, and the rear flap 58 is pivotable relative to the tilt-wing 16. Therefore, the rear flap 58 may be movable about the pivot point 52 between the initial position and the deployed position relative to the tilt-wing 16. Deploying the rear flap 58 allows the tilt-wing 16 to operate at a higher angle of attack as compared to the rear flap 58 not being deployed or using the tilt-wing 16 without having the rear flap 58. The outlet 42 may be disposed adjacent to the trailing edge 34 to direct the pressurized air along a knee 60 of the rear flap 58 (see FIG. 7). Generally, the knee 60 of the rear flap 58 is located where the airflow separation may occur, and thus, blowing the knee 60 of the rear flap 58 may prevent or delay the airflow separation from the tilt-wing 16. For illustrative purposes, the knee 60 of the rear flap 58 may be along the greatest curvature of the rear flap 58 when the rear flap 58 is at a high deflection angle. By directing the pressurized air toward the knee 60 of the rear flap 58, the airflow separation may be delayed. Therefore, when the airflow separation is delayed, higher flap deflections and higher lift coefficients of the rear flap 58 may be permitted. It is to be appreciated that optionally more than one rear flap 58 may be disposed along the trailing edge 34 (which for illustrative purposes is shown in FIGS. 1-4). It is to also be appreciated that the tilt-wing 16 may have the front flap 54 without the rear flap 58, may have the rear flap 58 without the front flap 54, or may have both the rear flap 58 and the front flap 54.

Turning to FIG. 5, the aircraft 10 further includes a compressor 62 in fluid communication with the inlet 40 and the outlet 42. The compressor 62 is configured to increase pressure of the air that is expelled out of the outlet 42. When the compressor 62 operates, pressurized air is expelled from the compressor 62 and directed to one or more desired locations along the tilt-wing 16. The outlet 42 directs the pressurized air toward at least one of the high-lift device 48 and the center section 36 of the tilt-wing 16 to maintain attachment of airflow across the tilt-wing 16. When the high-lift device 48 is deployed, the pressurized air from the compressor 62 is directed to certain locations along the tilt-wing 16 which may delay separation of airflow across the tilt-wing 16. Specifically, the boundary layer 38 is being controlled by directing the pressurized air to at least one of the high-lift device 48 and the center section 36. Therefore, the compressor 62 may assist in improving the overall lift coefficient of the tilt-wing 16 in certain situations. That is, the outlet 42 expels the air toward at least one of the high-lift device 48 and the center section 36 of the tilt-wing 16 to improve lift characteristics of the tilt-wing 16, and ultimately improve lift characteristics of the aircraft 10. Any suitable compressor 62 may be used, and non-limiting examples may include a centrifugal impeller, multiple stage centrifugal compressor, an axial compressor, or any other suitable compressor to pressurize air.

Continuing with FIG. 5, the aircraft 10 may include a torque transmitting apparatus 64 configured to selectively transfer torque to the compressor 62, and in certain configurations, transfer torque to the compressor 62 as the aircraft 10 descends. Therefore, the torque transmitting apparatus 64 is coupled to the compressor 62. More specifically, the torque transmitting apparatus 64 is coupled to the transmission 22 and the compressor 62. The torque transmitting apparatus 64 is connected to the transmission 22 to selectively transfer a portion of the torque from the transmission 22 to the compressor 62. The powerplant 20 supplies the torque to operate the compressor 62, and selectively engaging the torque transmitting apparatus 64 selectively directs some of the torque to the compressor 62. Therefore, the torque transmitting apparatus 64 is selectively engaged between the powerplant 20 and the compressor 62, and thus, the torque transmitting apparatus 64 is configured to selectively transfer a portion of the torque to the compressor 62. In certain configurations, the torque transmitting apparatus 64 is configured to selectively transfer a portion of the torque to the compressor 62 when the high-lift device 48 is deployed and the tilt-wing 16 is transitioned between the cruise position and the hover position as the aircraft 10 descends.

The torque transmitting apparatus 64 is movable between an engaged position in which the torque transmitting apparatus 64 engages or connects to the transmission 22 to transfer some of the torque to the compressor 62 and a disengaged position in which the torque transmitting apparatus 64 disengages or disconnects from the transmission 22 to stop the transfer of torque to the compressor 62 and thus stops the operation of the compressor 62. The torque transmitting apparatus 64 may include one or more clutches such as a single-plate clutch or a multi-plate clutch, or any other suitable torque transmitting apparatus may be used to selectively transfer the torque to the compressor 62.

In certain configurations, the compressor 62 and the torque transmitting apparatus 64 are disposed inside the nacelle 26. It is to be appreciated that the compressor 62 and the torque transmitting apparatus 64 may optionally be housed in the wing housing 24 or any other suitable location within the aircraft 10.

Figure 8:
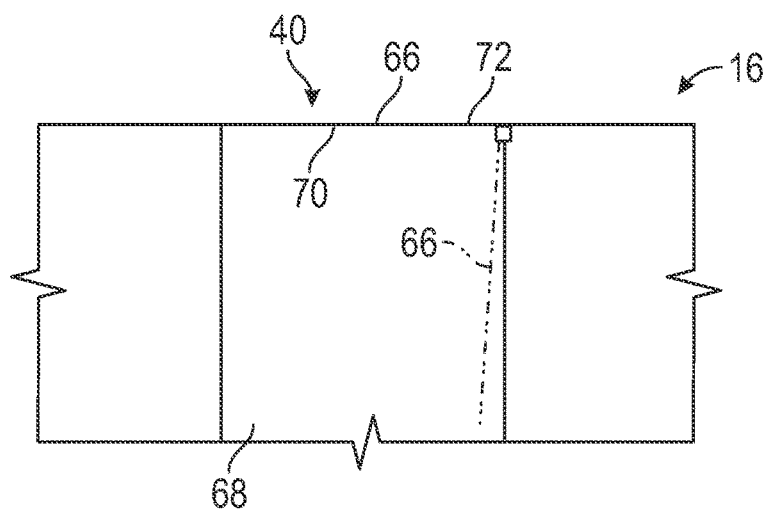
FIG. 8 is a schematic illustration of a door relative to an inlet defined by the tilt-wing.

Referring to FIG. 8, optionally, a door 66 may be attached to the tilt-wing 16 adjacent to the inlet 40. The door 66 is movable relative to the tilt-wing 16 to selectively close the inlet 40. Therefore, the door 66 may be movable to open and close the inlet 40. Generally, the door 66 is normally in a closed position (the closed position is shown in solid lines in FIG. 8), in which the door 66 normally closes the inlet 40. The door 66 is movable to an open position (the open position is shown in dash-dot-dot-dash lines in FIG. 8), in which the door 66 at least partially moves away from the inlet 40 to open the inlet 40. When the door 66 closes the inlet 40, the air cannot enter the inlet 40, and thus, the door 66 may assist in decreasing drag when the aircraft 10 is cruising. The door 66 may open and close via spring-loaded components and/or via an actuator. If more than one inlet 40 is disposed along the tilt-wing 16, each of the inlets 40 may optionally use a door 66.

Various ducting may be used to direct the pressurized air to the desired location along the tilt-wing 16. As best shown in FIGS. 5 and 8, for example, the control system 12 may include a first duct 68 disposed between the inlet 40 and the compressor 62. The first duct 68 is configured to guide the air from the inlet 40 to the compressor 62. Therefore, the first duct 68 receives ambient air from the inlet 40. If more than one inlet 40 is disposed along the tilt-wing 16, the first duct 68 may branch to each of the inlets 40 to guide the air from the respective inlet 40 to the compressor 62. Optionally, more than one first duct 68 may be used. If the door 66 is a passive door (for example, the door 66 is spring-loaded), actuation of the compressor 62 creates a pressure differential between an inside 70 (see FIG. 8) of the door 66 along the first duct 68 and an outside 72 (see FIG. 8) of the door 66 which moves the door 66 to open the inlet 40. That is, the spring bias force (from the door 66 being spring-loaded) is overcome to move the door 66 to the open position.

As best shown in FIGS. 5-7, the control system 12 may include a second duct 74 disposed between the compressor 62 and the outlet 42. The second duct 74 may be configured to guide the pressurized air to the outlet 42. The second duct 74 may be disposed in various locations within the tilt-wing 16 depending on the location of the outlet 42. The outlet 42 may branch to multiple locations along the tilt-wing 16. For example, in certain configurations, the outlet 42 may include a first outlet segment 76 disposed adjacent to the leading edge 32 and a second outlet segment 78 disposed adjacent to the trailing edge 34. The second duct 74 may branch into a first portion 80 that extends to the first outlet segment 76 along the leading edge 32 to direct the pressurized air to the first outlet segment 76 and a second portion 82 that extends to the second outlet segment 78 along the trailing edge 34 to direct the pressurized air to the second outlet segment 78. Furthermore, the outlet 42 may include a third outlet segment 84 disposed adjacent to the center section 36, and the second duct 74 may branch into a third portion 86 that extends to the third outlet segment 84 along the center section 36. Optionally, more than one second duct 74 may be used.

Optionally, one or more valves 88 (see FIG. 5) may be disposed along the second duct 74 to change a direction of the flow path of the pressurized air. Therefore, the valves 88 may be opened and closed, which may include partially opened/closed and fully opened/closed. Actuation of the valves 88 may change the direction that the pressurized air flows through the second duct 74 and which outlet 42 receives the pressurized air. The valves 88 may be any suitable configuration, and non-limiting examples may include a one-way valve 88, a two-way valve 88, a three-way valve 88, etc., a solenoid or electronic valve 88, a pneumatic valve 88, a hydraulic valve 88, etc.

The control system 12 may include a controller 90 configured to communicate with and control various components of the aircraft 10. It is to be appreciated that the control system 12 may include various components and structures discussed above.

The controller 90 may collect data from one or more sensors 92 regarding ascent rate, descent rate, speed of ascent, speed of descent, angle of ascent, angle of descent, air speed, the position of the tilt-wing 16, the position of the high-lift device 48, the position of the valves 88, the position of the torque transmitting apparatus 64, the position of the door 66, etc., and this data is used to determine when to activate or control various components and structures of the aircraft 10. For example, the controller 90 may signal the torque transmitting apparatus 64 to engage the transmission 22 to direct some torque to the compressor 62 to operate the compressor 62, or disengage the transmission 22 to stop the operation of the compressor 62. As another example, the controller 90 may signal one or more valves 88 to open or close to direct the pressurized air to the desired outlet 42. The sensors 92 may include one or more of a pitot tube, a pitot vane, a gyroscope, an inertial navigation component, accelerometer, etc.

Instructions may be stored in a memory 94 of the controller 90 and automatically executed via a processor 96 of the controller 90 to provide the respective control functionality. The controller 90 is configured to execute the instructions from the memory 94, via the processor 96. For example, the controller 90 may be a host machine or distributed system, e.g., a computer such as a digital computer or microcomputer, and, as the memory 94, tangible, non-transitory computer-readable memory such as read-only memory (ROM) or flash memory. The controller 90 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 90 may include all software, hardware, memory 94, algorithms, connections, sensors, etc., necessary to control and monitor for example, the various components discussed herein, including but not limited to the torque transmitting apparatus 64, the high-lift device 48, the compressor 62, the valve 88, the door 66, the sensors 92, etc. As such, a control method may be embodied as software or firmware associated with the controller 90. It is to be appreciated that the controller 90 may also include any device capable of analyzing data from various sensors 92, comparing data, making the necessary decisions required to control and/or monitor the torque transmitting apparatus 64, the high-lift device 48, the compressor 62, the valve 88, the door 66, the sensors 92, etc. Optionally, more than one controller 90 may be utilized. Additional control features and operation of the control system 12 are discussed next.

The present disclosure also provides a method of operating the control system 12 of the aircraft 10. The method provides a way to add additional energy to the boundary layer 38, which causes the boundary layer 38 to remain attached to the top surface 28 of the tilt-wing 16, and thus continue to generate lift as the angle of attack increases, as discussed below.

The tilt-wing 16 of the aircraft 10 transitions between the cruise position and the hover position. As discussed above, for example, the tilt-wing may pivot to the transition position which is between the hover position and cruise position, and transitioning may occur during ascent of the aircraft 10 and during descent of the aircraft 10. Generally, operating the control system 12 of the aircraft 10 occurs during descent of the aircraft 10 due to the additional available power from the powerplant 20 when descending. During descent when thrust is decreased, the propeller slipstream decreases, and thus, the boundary layer 38 slows down which may lead to airflow separation. The control system 12 provides additional energy to the boundary layer 38, which causes the boundary layer 38 to remain attached to the top surface 28 of the tilt-wing 16, and thus continue to generate lift as the angle of attack increases. That is, the control system 12 prevents or limits airflow separation from the tilt-wing 16, which thus, improves lift characteristics of the tilt-wing 16 and the aircraft 10.

Therefore, the method includes determining whether a boundary layer separation condition is met. The boundary layer separation condition occurs as a boundary of airflow begins to separate from the tilt-wing 16. That is, when a boundary of airflow separation occurs across the tilt-wing 16, the boundary layer separation condition is met. The controller 90 may communicate with the sensors 92 and various components of the aircraft 10 to collect data and make decisions, etc., regarding whether the boundary layer separation condition is met.

When it is desirable to land the aircraft 10, the tilt-wing 16 is pivoted from the cruise position to the transition position (inbound transition). Therefore, the tilt-wing 16 of the aircraft 10 is pivoted to the transition position as the aircraft 10 descends. That is, the tilt-wing 16 transitions from the cruise position toward the hover position during descent. The controller 90 monitors the position of the tilt-wing 16 via one or more of the sensors 92, and in certain configurations, collects data, via the controller 90, regarding at least one of the descent rate of the aircraft 10 and the angle of descent of the aircraft 10 as the aircraft 10 descends. In other configurations, the controller 90 collects data regarding at least one of the descent rate of the aircraft 10 and the amount of throttle of the powerplant 20, i.e., the speed of the propeller slipstream, as the aircraft 10 descends. Therefore, the controller 90 may be in communication with one or more of the sensors 92 to collect the data regarding at least one of the descent rate, the angle of descent, the amount of throttle of the powerplant 20, and combinations thereof, and the controller 90 may use this data to determine when to activate the compressor 62. In certain configurations, the controller 90 may also collect data regarding the air speed such as the air speed over the top surface 28 of the tilt-wing 16, the speed of descent of the aircraft 10, etc., via one or more of the sensors 92 to determine when to activate the compressor 62.

Also, during descent of the aircraft 10, the high-lift device 48 may be actuated to assist in maintaining attachment of the airflow across the tilt-wing 16. The high-lift device 48 is actuated along at least one of the leading edge 32 of the tilt-wing 16 and the trailing edge 34 of the tilt-wing 16 when the tilt-wing 16 transitions between the cruise position and the hover position. That is, the high-lift device 48 may be deployed as the tilt-wing 16 transitions toward the hover position. The controller 90 may signal the high-lift device 48 to move to the deployed position while the tilt-wing 16 is transitioning during descent of the aircraft 10. The deployed position changes the deflection angle of the high-lift device 48 relative to the tilt-wing 16. Due to the deflection angle of the high-lift device 48 when in the deployed position, the airflow separation may occur as the angle of attack increases. The controller 90 may monitor the position of the high-lift device 48, and thus, monitors whether the airflow separation is approaching or has begun.

In certain configurations, the high-lift device 48 may be deployed after the tilt-wing 16 moves to the transition position. In other configurations, the high-lift device 48 may be deployed before the tilt-wing 16 moves to the transition position. In yet other configurations, the high-lift device 48 may be deployed simultaneously with the tilt-wing 16 moving to the transition position.

As discussed above, the tilt-wing 16 defines the inlet 40 configured to receive the air and the outlet 42 in fluid communication with the inlet 40 such that the outlet 42 is configured to expel the air. The compressor 62 is activated in response to meeting the boundary layer separation condition, in which the compressor 62 operates to increase pressure of the air that is expelled out of the outlet 42. The outlet 42 directs the pressurized air toward at least one of the high-lift device 48 and the center section 36 of the tilt-wing 16 to maintain attachment of airflow across the tilt-wing 16, and in certain configurations, this may occur as the tilt-wing 16 transitions toward the hover position. In certain configurations, activating the compressor 62 occurs when a predefined threshold of at least one of the descent rate and the angle of descent is reached as the aircraft 10 descends. In other configurations, activation of the compressor 62 may occur when the predefined threshold of at least one of the descent rate, the angle of descent, the amount of throttle of the powerplant 20, and combinations thereof, is reached as the aircraft 10 descends. In yet other configurations, activation of the compressor 62 may occur when the predefined threshold of at least one of the air speed such as the air speed over the top surface 28 of the tilt-wing 16, the speed of descent of the aircraft 10, the descent rate of the aircraft 10, the angle of descent of the aircraft 10, the amount of throttle of the powerplant 20, etc., and combinations thereof, is reached as the aircraft 10 descends.

Therefore, in certain configurations, when the aircraft 10 is descending above a certain combination of the descent rate and the angle of descent, and the angle of attack of the tilt-wing 16 is high, airflow separation across the tilt-wing 16 may be reduced via the control system 12 as discussed in the method. One non-limiting example of a high angle of attack of the tilt-wing 16 is where the aircraft 10 is descending at six-hundred feet per minute with a glideslope angle of negative eight degrees.

The predefined threshold may occur when a boundary of airflow separation is reached. That is, the predefined threshold is reached when the airflow separation is about to occur, approaching, or has begun. Furthermore, the boundary layer separation condition may be met when the predefined threshold is reached. When the predefined threshold is reached, the controller 90 signals the torque transmitting apparatus 64 to engage the transmission 22 which directs a portion of the torque from the powerplant 20 to the compressor 62 to activate the compressor 62. The predefined threshold may be any suitable value(s) of the descent rate of the aircraft 10, the angle of descent of the aircraft 10, the amount of throttle of the powerplant 20, the air speed such as the air speed over the top surface 28 of the tilt-wing 16, the speed of descent of the aircraft 10, and combinations thereof, based on engineering requirements, government requirements, etc.

The powerplant 20 operates to produce the torque that rotates the propeller 18 and activates the compressor 62 as the aircraft 10 descends. More specifically, the powerplant 20 operates to decrease production of the torque which decreases rotation of the propeller 18 as the aircraft 10 descends. Generally, in this situation, the propeller slipstream decreases, and thus, the boundary layer 38 slows down which may lead to the airflow separation. Activating the compressor 62 occurs when approaching the boundary of the airflow separation across the tilt-wing 16 while the tilt-wing 16 transitions toward the hover position. For example, activating the compressor 62 occurs when the boundary layer separation condition is met while the tilt-wing 16 transitions toward the hover position. The torque transmitting apparatus 64 engages to transfer the portion of the torque from the powerplant 20 to the compressor 62 which activates the compressor 62 as the tilt-wing 16 transitions toward the hover position. Therefore, the pressurize air is expelled at the desired locations along at least one of the high-lift device 48 and the center section 36 when the compressor 62 is activated. For illustrative purposes, the arrow within the second duct 74 and the arrow exiting the outlet 42 are general illustrations of the pressurized air being expelled from the tilt-wing.

The torque transmitting apparatus 64, and thus, the compressor 62, may be activated after the high-lift device 48 is deployed to the deployed position. Furthermore, the torque transmitting apparatus 64, and thus, the compressor 62, may be deactivated before the high-lift device 48 is retracted to the initial position.

If using one or more valves 88, the controller 90 may signal the selected valve 88 to move to the open position and/or the closed position. In certain configurations, the valves 88 may actuate before the compressor 62 is activated. In other configurations, the valves 88 may actuate simultaneously with or after activation of the compressor 62.

If using the door 66 to cover the inlet 40 when the compressor 62 is not operating, the door 66 may be passively opened or electronically controlled to open. The door 66 is normally in the closed position when the compressor 62 is not being operated. For example, the compressor 62 may activated to create the pressure differential between the inside 70 (see FIG. 8) of the door 66 and the outside 72 (see FIG. 8) of the door 66 which causes movement of the door 66 to move to the open position to open the inlet 40. That is, in certain configurations, the door 66 opens the inlet 40 in response to activation of the compressor 62 due to the pressure differential created between the inside 70 of the door 66 and the outside 72 of the door 66. Alternatively, the controller 90 may signal the actuator to activate and move the door 66 to the open position. In certain configurations, the door 66 may open before the compressor 62 is activated. In other configurations, the door 66 may open simultaneously with or after activation of the compressor 62.

The controller 90 determines when to deactivate the compressor 62 which stops the flow of pressurized air out of the outlet 42. For example, the compressor 62 may be deactivated when the tilt-wing 16 is pivoted to the hover position. As another example, the compressor 62 may be deactivated when the predefined threshold is not reached. The controller 90 signals the torque transmitting apparatus 64 to move to the disengaged position which stops the transfer of torque to the compressor 62, and thus, the compressor 62 deactivates.

Turning to take-off or ascending, the powerplant 20 operates to produce torque to rotate the propeller 18 as the aircraft 10 ascends and in certain configurations, the compressor 62 is deactivated as the aircraft 10 ascends. More specifically, the powerplant 20 operates to increase production of the torque to increase rotation of the propeller 18 as the aircraft 10 ascends. Generally, in this situation, the compressor 62 is deactivated as the aircraft 10 ascends so that the size (i.e., output of torque) of the powerplant 20 does not need to be large enough to power both the propeller 18 and the compressor 62 during take-off (take-off/ascent requires more power than during landing/descent). However, in certain configurations, the powerplant 20 may be sized to provide enough torque to operate both the propeller 18 and the compressor 62 during ascent. The tilt-wing 16 may be in the hover position or the transition position, i.e., outbound transition, when the aircraft 10 is ascending, in which case, the torque transmitting apparatus 64 is disengaged and thus the compressor 62 is deactivated. Furthermore, when the tilt-wing 16 is in the hover position, the cruise position, or the outbound transition, the torque transmitting apparatus 64 is disengaged and thus the compressor 62 is deactivated. That is, the compressor 62 does not operate when the tilt-wing 16 is in the hover position, the cruise position, or the outbound transition. Said differently, the controller 90 does not signal the torque transmitting apparatus 64 to engage when the tilt-wing 16 is in the hover position, the cruise position, or the outbound transition.

It is to be appreciated that the order or sequence of performing the method as discussed herein is for illustrative purposes and other orders or sequences are within the scope of the present teachings. It is to also be appreciated that the method may include other features not specifically identified in the method discussed above.

Furthermore, the teachings may be described herein in terms of functional and/or logical block components and/or various processing steps. It should be realized that such block components may be comprised of any number of hardware, software, and/or firmware components configured to perform the specified functions.

The following Clauses provide some example configurations of the control system, the aircraft, and the method as disclosed herein.

Clause 1: A control system for an aircraft, the control system comprising: a tilt-wing including a leading edge, a trailing edge, and a center section disposed adjacent to the leading edge, and the tilt-wing is pivotable between a cruise position and a hover position, and wherein the tilt-wing defines an inlet configured to receive air and an outlet in fluid communication with the inlet such that the outlet is configured to expel the air; a high-lift device coupled to at least one of the leading edge and the trailing edge of the tilt-wing, and the high-lift device is movable relative to the tilt-wing, when deployed, as the tilt-wing transitions between the cruise position and the hover position; and a compressor in fluid communication with the inlet and the outlet, and the compressor is configured to increase pressure of the air that is expelled out of the outlet, and the outlet directs the pressurized air toward at least one of the high-lift device and the center section of the tilt-wing to maintain attachment of airflow across the tilt-wing.

Clause 2: The control system as set forth in clause 1 further including a torque transmitting apparatus coupled to the compressor, and the torque transmitting apparatus is configured to selectively transfer torque to the compressor as the aircraft descends.

Clause 3: The control system as set forth in clause 2: further including a powerplant configured to produce the torque; further including a propeller supported by the tilt-wing, and the propeller is coupled to the powerplant such that the powerplant supplies the torque to rotate the propeller; and wherein the torque transmitting apparatus is selectively engaged between the powerplant and the compressor.

Clause 4: The control system as set forth in clause 3 further including a transmission coupled to the powerplant and the propeller such that the transmission transfers the torque from the powerplant to the propeller, and the torque transmitting apparatus is connected to the transmission to selectively transfer a portion of the torque from the transmission to the compressor.

Clause 5: The control system as set forth in clauses 3 or 4 wherein: the tilt-wing includes a wing housing and a nacelle attached to the wing housing, and the propeller protrudes outside of the nacelle; the nacelle defines the inlet; and the compressor and the torque transmitting apparatus are disposed inside of the nacelle.

Clause 6: The control system as set forth in any of the preceding clauses wherein: the high-lift device includes a rear flap coupled to the trailing edge of the tilt-wing, and the rear flap is pivotable relative to the tilt-wing; and the outlet is disposed adjacent to the trailing edge to direct the pressurized air along a knee of the rear flap.

Clause 7: The control system as set forth in any of the preceding clauses wherein: the high-lift device includes a front flap coupled to the leading edge of the tilt-wing, and the front flap is pivotable relative to the tilt-wing; and the outlet is disposed adjacent to the leading edge to direct the pressurized air along a knee of the front flap.

Clause 8: The control system as set forth in any of the preceding clauses wherein the outlet is disposed adjacent to the center section of the tilt-wing.

Clause 9: The control system as set forth in any of the preceding clauses further including a door attached to the tilt-wing adjacent to the inlet, and the door is movable relative to the tilt-wing to selectively close the inlet.

Clause 10: The control system as set forth in clause 9: further including a first duct disposed between the inlet and the compressor, and the first duct is configured to guide the air from the inlet to the compressor; and wherein actuation of the compressor creates a pressure differential between the first duct and an outside of the door which moves the door to open the inlet.

Clause 11: The control system as set forth in any of the preceding clauses further including a second duct disposed between the compressor and the outlet, and the second duct is configured to guide the pressurized air to the outlet.

Clause 12: The control system as set forth in clause 11 wherein: the outlet includes a first outlet segment disposed adjacent to the leading edge and a second outlet segment disposed adjacent to the trailing edge; and the second duct branches into a first portion that extends to the first outlet segment along the leading edge to direct the pressurized air to the first outlet segment and a second portion that extends to the second outlet segment along the trailing edge to direct the pressurized air to the second outlet segment.

Clause 13: An aircraft comprising: a fuselage; a control system including: a tilt-wing coupled to the fuselage and including a leading edge, a trailing edge, and a center section disposed adjacent to the leading edge, and the tilt-wing is pivotable relative to the fuselage between a cruise position and a hover position, wherein the tilt-wing defines an inlet configured to receive air and an outlet in fluid communication with the inlet such that the outlet is configured to expel the air; a high-lift device coupled to at least one of the leading edge and the trailing edge of the tilt-wing, and the high-lift device is movable relative to the tilt-wing, when deployed, as the tilt-wing transitions between the cruise position and the hover position; and a compressor in fluid communication with the inlet and the outlet, and the compressor is configured to increase pressure of the air that is expelled out of the outlet, and the outlet directs the pressurized air toward at least one of the high-lift device and the center section of the tilt-wing to maintain attachment of airflow across the tilt-wing.

Clause 14: The aircraft as set forth in clause 13 further including: a powerplant coupled to the fuselage and configured to produce torque; a propeller supported by the tilt-wing; a transmission coupled to the powerplant and the propeller, and the transmission is configured to transfer the torque to the propeller to rotate the propeller; and a torque transmitting apparatus coupled to the transmission and the compressor, and the torque transmitting apparatus is configured to selectively transfer a portion of the torque to the compressor when the high-lift device is deployed and the tilt-wing is transitioned between the cruise position and the hover position as the aircraft descends.

Clause 15: The aircraft as set forth in clauses 13 or 14 wherein the outlet is disposed adjacent to at least one of the trailing edge of the tilt-wing, the leading edge of the tilt-wing, and the center section of the tilt-wing.

Clause 16: A method of operating a control system of an aircraft, the method comprising: transitioning a tilt-wing of the aircraft between a cruise position and a hover position, wherein the tilt-wing defines an inlet configured to receive air and an outlet in fluid communication with the inlet such that the outlet is configured to expel the air; actuating a high-lift device along at least one of a leading edge of the tilt-wing and a trailing edge of the tilt-wing when the tilt-wing transitions between the cruise position and the hover position; determining whether a boundary layer separation condition is met, wherein the boundary layer separation condition occurs as a boundary of airflow begins to separate from the tilt-wing; and activating a compressor in response to meeting the boundary layer separation condition, in which the compressor operates to increase pressure of the air that is expelled out of the outlet, and the outlet directs the pressurized air toward at least one of the high-lift device and a center section of the tilt-wing to maintain attachment of airflow across the tilt-wing.

Clause 17: The method as set forth in clause 16: further comprising collecting data, via a controller, regarding at least one of a descent rate of the aircraft and an angle of descent of the aircraft as the aircraft descends; and wherein activating the compressor occurs when a predefined threshold of at least one of the descent rate and the angle of descent is reached as the aircraft descends.

Clause 18: The method as set forth in clauses 16 or 17 further comprising: operating a powerplant to produce torque that rotates a propeller and activates the compressor as the aircraft descends, and wherein the tilt-wing transitions toward the hover position as the aircraft descends; and engaging a torque transmitting apparatus to transfer a portion of the torque from the powerplant to the compressor which activates the compressor as the tilt-wing transitions toward the hover position.

Clause 19: The method as set forth in clause 18 further comprising: operating the powerplant to decrease production of the torque to decrease rotation of the propeller as the aircraft descends, and the tilt-wing transitions toward the hover position as the aircraft descends; and wherein activating the compressor occurs when the boundary layer separation condition is met while the tilt-wing transitions toward the hover position.

Clause 20: The method as set forth in any of clauses 16-19 further comprising: operating a powerplant to increase production of torque to increase rotation of a propeller as the aircraft ascends; and deactivating the compressor as the aircraft ascends.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

What is claimed is:

1. A control system for an aircraft, the control system comprising:
   a tilt-wing including a leading edge, a trailing edge, and a center section disposed adjacent to the leading edge, and the tilt-wing is pivotable between a cruise position and a hover position, and wherein the tilt-wing defines an inlet configured to receive air and an outlet in fluid communication with the inlet such that the outlet is configured to expel the air;
   a high-lift device coupled to at least one of the leading edge and the trailing edge of the tilt-wing, and the high-lift device is movable relative to the tilt-wing, when deployed, as the tilt-wing transitions between the cruise position and the hover position; and
   a compressor in fluid communication with the inlet and the outlet, and the compressor is configured to increase pressure of the air that is expelled out of the outlet, and the outlet directs the pressurized air toward at least one of the high-lift device and the center section of the tilt-wing to maintain attachment of airflow across the tilt-wing.

2. The control system as set forth in claim 1 further including a torque transmitting apparatus coupled to the compressor, and the torque transmitting apparatus is configured to selectively transfer torque to the compressor as the aircraft descends.

3. The control system as set forth in claim 2:
   further including a powerplant configured to produce the torque;
   further including a propeller supported by the tilt-wing, and the propeller is coupled to the powerplant such that the powerplant supplies the torque to rotate the propeller; and wherein the torque transmitting apparatus is selectively engaged between the powerplant and the compressor.

4. The control system as set forth in claim 3 further including a transmission coupled to the powerplant and the propeller such that the transmission transfers the torque from the powerplant to the propeller, and the torque transmitting apparatus is connected to the transmission to selectively transfer a portion of the torque from the transmission to the compressor.

5. The control system as set forth in claim 3 wherein:
the tilt-wing includes a wing housing and a nacelle attached to the wing housing, and the propeller protrudes outside of the nacelle;
the nacelle defines the inlet; and
the compressor and the torque transmitting apparatus are disposed inside of the nacelle.

6. The control system as set forth in claim 1 wherein:
the high-lift device includes a rear flap coupled to the trailing edge of the tilt-wing, and the rear flap is pivotable relative to the tilt-wing; and
the outlet is disposed adjacent to the trailing edge to direct the pressurized air along a knee of the rear flap.

7. The control system as set forth in claim 1 wherein:
the high-lift device includes a front flap coupled to the leading edge of the tilt-wing, and the front flap is pivotable relative to the tilt-wing; and
the outlet is disposed adjacent to the leading edge to direct the pressurized air along a knee of the front flap.

8. The control system as set forth in claim 1 wherein the outlet is disposed adjacent to the center section of the tilt-wing.

9. The control system as set forth in claim 1 further including a door attached to the tilt-wing adjacent to the inlet, and the door is movable relative to the tilt-wing to selectively close the inlet.

10. The control system as set forth in claim 9:
further including a first duct disposed between the inlet and the compressor, and the first duct is configured to guide the air from the inlet to the compressor; and
wherein actuation of the compressor creates a pressure differential between the first duct and an outside of the door which moves the door to open the inlet.

11. The control system as set forth in claim 10 further including a second duct disposed between the compressor and the outlet, and the second duct is configured to guide the pressurized air to the outlet.

12. The control system as set forth in claim 11 wherein:
the outlet includes a first outlet segment disposed adjacent to the leading edge and a second outlet segment disposed adjacent to the trailing edge; and
the second duct branches into a first portion that extends to the first outlet segment along the leading edge to direct the pressurized air to the first outlet segment and a second portion that extends to the second outlet segment along the trailing edge to direct the pressurized air to the second outlet segment.

13. An aircraft comprising:
a fuselage;
a control system including:
a tilt-wing coupled to the fuselage and including a leading edge, a trailing edge, and a center section disposed adjacent to the leading edge, and the tilt-wing is pivotable relative to the fuselage between a cruise position and a hover position, wherein the tilt-wing defines an inlet configured to receive air and an outlet in fluid communication with the inlet such that the outlet is configured to expel the air;
a high-lift device coupled to at least one of the leading edge and the trailing edge of the tilt-wing, and the high-lift device is movable relative to the tilt-wing, when deployed, as the tilt-wing transitions between the cruise position and the hover position; and
a compressor in fluid communication with the inlet and the outlet, and the compressor is configured to increase pressure of the air that is expelled out of the outlet, and the outlet directs the pressurized air toward at least one of the high-lift device and the center section of the tilt-wing to maintain attachment of airflow across the tilt-wing.

14. The aircraft as set forth in claim 13 further including:
a powerplant coupled to the fuselage and configured to produce torque;
a propeller supported by the tilt-wing;
a transmission coupled to the powerplant and the propeller, and the transmission is configured to transfer the torque to the propeller to rotate the propeller; and
a torque transmitting apparatus coupled to the transmission and the compressor, and the torque transmitting apparatus is configured to selectively transfer a portion of the torque to the compressor when the high-lift device is deployed and the tilt-wing is transitioned between the cruise position and the hover position as the aircraft descends.

15. The aircraft as set forth in claim 13 wherein the outlet is disposed adjacent to at least one of the trailing edge of the tilt-wing, the leading edge of the tilt-wing, and the center section of the tilt-wing.

16. A method of operating a control system of an aircraft, the method comprising:
transitioning a tilt-wing of the aircraft between a cruise position and a hover position, wherein the tilt-wing defines an inlet configured to receive air and an outlet in fluid communication with the inlet such that the outlet is configured to expel the air;
actuating a high-lift device along at least one of a leading edge of the tilt-wing and a trailing edge of the tilt-wing when the tilt-wing transitions between the cruise position and the hover position;
determining whether a boundary layer separation condition is met, wherein the boundary layer separation condition occurs as a boundary of airflow begins to separate from the tilt-wing; and
activating a compressor in response to meeting the boundary layer separation condition, in which the compressor operates to increase pressure of the air that is expelled out of the outlet, and the outlet directs the pressurized air toward at least one of the high-lift device and a center section of the tilt-wing to maintain attachment of airflow across the tilt-wing.

17. The method as set forth in claim 16:
further comprising collecting data, via a controller, regarding at least one of a descent rate of the aircraft and an angle of descent of the aircraft as the aircraft descends; and
wherein activating the compressor occurs when a predefined threshold of at least one of the descent rate and the angle of descent is reached as the aircraft descends.

18. The method as set forth in claim 16 further comprising:
operating a powerplant to produce torque that rotates a propeller and activates the compressor as the aircraft descends, and wherein the tilt-wing transitions toward the hover position as the aircraft descends; and engaging a torque transmitting apparatus to transfer a portion of the torque from the powerplant to the compressor which activates the compressor as the tilt-wing transitions toward the hover position.

19. The method as set forth in claim 18 further comprising:
operating the powerplant to decrease production of the torque to decrease rotation of the propeller as the aircraft descends, and the tilt-wing transitions toward the hover position as the aircraft descends; and
wherein activating the compressor occurs when the boundary layer separation condition is met while the tilt-wing transitions toward the hover position.

20. The method as set forth in claim 16 further comprising:
operating a powerplant to increase production of torque to increase rotation of a propeller as the aircraft ascends; and
deactivating the compressor as the aircraft ascends.

* * * * *